Aug. 5, 1969  J. P. PALLOTTA  3,459,187
SURGICAL INSTRUMENT AND METHOD OF MANUFACTURE
Filed March 9, 1967

INVENTOR.
JOSEPH PETER PALLOTTA
BY
Weingarten, Schenbuck & Lahive
ATTORNEYS

United States Patent Office 3,459,187
Patented Aug. 5, 1969

3,459,187
SURGICAL INSTRUMENT AND METHOD OF MANUFACTURE
Joseph Peter Pallotta, Brooklyn, N.Y., assignor to Edward Weck & Company, Inc., Long Island City, N.Y., a corporation of Delaware
Filed Mar. 9, 1967, Ser. No. 621,850
Int. Cl. A61b 17/28, 17/32
U.S. Cl. 128—321                    11 Claims

ABSTRACT OF THE DISCLOSURE

A self-lubricating plastic bearing sleeve is included between the pivot pin and the pivoting member in the box lock hinge of a forceps type surgical instrument; the plastic bearing being maintained in compression throughout its volume to permit rotary action substantially without backlash, coasting, or galling of metal surfaces.

FIELD OF THE INVENTION

This invention relates in general to forceps type instruments and more particularly to an improved box lock hinge for a forceps type surgical instrument.

DESCRIPTION OF THE PRIOR ART

Surgical instruments must necessarily be constructed to meet several rather exacting requirements. One primary requirement is precision. Precision in this context applies not only to the size and shape of an instrument, but also to its operation where there are parts which move relative to one another. This is especially so for instruments such as forceps and clamps which are used during delicate operations. In such instruments it is desirable that the device operate with a smooth "feel," characterized by a smooth, easy action, free from backlash, binding and erratic motion. Once positioned, the movable members should stay in their relative positions, thus imposing the requirement that there be no slippage or coasting (the opposite motion to backlash, in which relative motion continues after the normal force required for operation has been removed).

In addition to these operational characteristics surgical instruments must be formed of materials capable of withstanding the high temperatures and moisture encountered in sterilizing procedures, such as autoclaving.

The hinge normally used for a forceps type surgical instrument is known as a "box lock." The name stems from the fact that one member fits through a box-shaped slot in the other and the internal member has shoulders which prevent its removal from the external member, that is, the internal member is locked in. A pin pivotally connects the two members and allows rotational movement of the internal member within the slot of the other. This configuration provides a very strong and reliable hinge in which motion is restricted to one plane, thereby avoiding any twist in the pivoting action. The members may be connected by inserting a closely fitting pin through them, securing it to the external member and finishing the ends to provide a smooth surface. Another method, which allows for greater tolerance in pin size and requires no adhesive to secure it to the external member, is to insert a pin which protrudes from both sides of the box lock; compress it by hammering so that it completely fills the holes through which it passes; and smoothly finish the ends. The latter method of connecting the moving parts together is that which is generally used in surgical instruments. However, due to the fact that the pin is compressed within the hole in order to head it over, it fits very tightly against the bearing surfaces of the movable internal member and the action of the instrument is generally quite tight, resulting in an erratic motion when opening or closing the jaws of the instrument. Such tightness also causes a small amount of backlash when movement force is released. In delicate surgical situations, tightness and the resultant irregular motion as above described are undesirable.

When the compressed pin method of assembly is used, prolonged use causes the pin and internal member to wear and the hinge is likely to become loose, allowing the instrument to drop open or closed without any intentional force being applied. Another disadvantage of this method of manufacture is that the forced metal-to-metal contact between the pin and the bearing surface of the internal member often results in a process known as galling, whereby microscopic metal particles are transferred from one bearing surface to the other, eventually resulting in roughness of the hinge action and possibly even freezing of the hinge, thus destroying the usefulness of the instrument. Because of the high temperatures required for sterilization, oil or grease lubricants cannot be used to provide a smooth action and longer hinge life.

SUMMARY OF THE INVENTION

Broadly speaking, this invention comprises the inclusion of a low friction, self-lubricating plastic bearing surface between the compressed connecting pin and the internal pivoting member. Such plastic must be chemically and physically stable at sterilizing temperatures. Materials which satisfy these requirements are nylon, Teflon and similar plastics. Previous attempts at lubricating box locks or adding a bearing sleeve have proved unsuccessful. One reason for the prior lack of success with plastic sleeve bearings was because such sleeves were compressible, and where a firm grip was required by the instrument, the pressure exerted at the bearing surfaces tended to allow lateral motion between the gripping members thus loosening the grip of the instrument. Furthermore, it is very difficult to provide a tight enough fit between the pivot pin and the rotating member after a bearing sleeve has been interposed therebetween to prevent coasting and generally imprecise operation. However, if the bearing sleeve is added before the connecting pin is compressed, as disclosed by this invention, the compressive forces applied in setting in the pin tend to expand the center of the pin into the area already occupied by the sleeve. This greatly compresses the plastic sleeve and deforms its bearing surface, and since bearings made of nylon, Teflon or substances with similar characteristics are known to have extremely long life, the result is a substantially non-compressible bearing exhibiting all of the desired characteristics; that is, it is durable and reliable, the action freely glides resulting in the feel so necessary when delicateness is required and there is no backlash or coasting when movement force is released. Furthermore, no galling occurs because there is no metal-to-metal contact and thus no possibility of binding or freezing with prolonged use.

Accordingly, it is an object of this invention to provide a box lock hinge for forceps which removes the metal-to-metal contact while maintaining operational precision.

Another object is to provide a hinge which has a greatly increased useful life and allows effortless gliding action, while at the same time preventing backlash or coasting when movement force is released.

These and other objects, advantages and features of the present invention will become apparent from the following detailed specification when read in conjunction with the accompanying drawing.

DESCRIPTION OF THE PREFERRED EMBODIMENT

Figure 1:
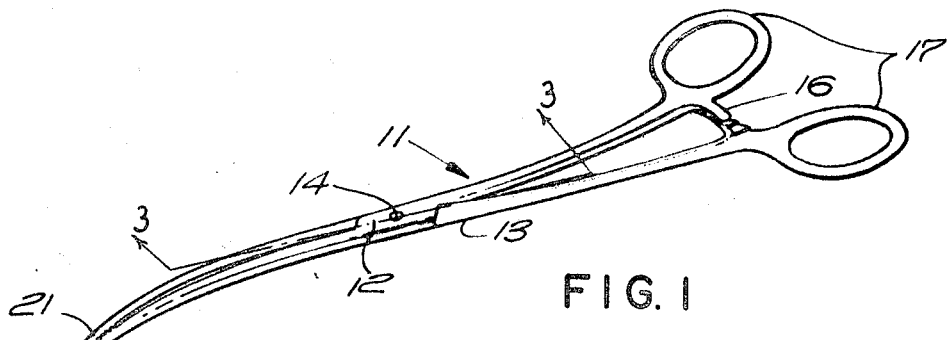
FIG. 1 is a perspective view of a surgical clamp constructed according to the present invention.

Referring now to the drawing, the surgical clamp 11 includes an external member 12, an internal member 13, a pivot pin 14 and a bearing sleeve 15. At one end of members 12 and 13 are multiple step, releasably engagable ratchets 16 adjacent to handle rings 17, which ratchets hold clamp 11 in a closed position and provide varying degrees of pressures at the gripping jaws 21 at the opposite ends of members 12 and 13. Jaws 21 may be clamped onto body tissues or other substances as desired.

Figure 2:
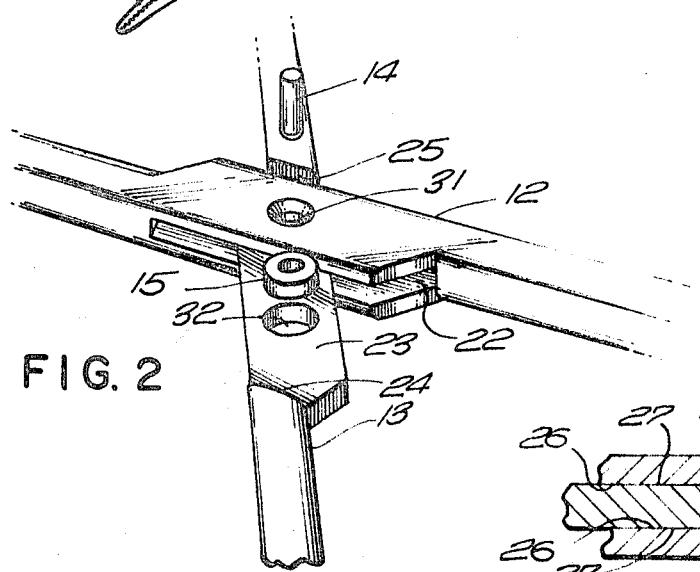
FIG. 2 is an exploded view of the hinge of this invention.
Figure 3:
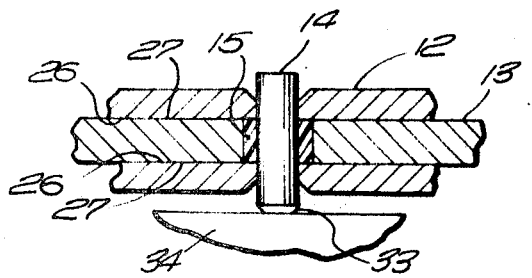
FIG. 3 is a sectional view of the hinge of FIG. 1 taken along plane 3—3, before the pivot pin is compressed.

The external member 12 is formed with slot 22 of rectangular cross section into which fits the flattened area 23 of internal member 13. Shoulders 24 and 25 on internal member 13 prevent that member from being removed from external member 12 after it has been inserted. In assembling these two parts, heat is applied to member 12 and slot 22 is expanded sufficiently to receive member 13; thereafter slot 22 is returned to its original size as shown, thus embracing flattened area 23. Surfaces 26 and 27 of members 12 and 13 respectively are substantially smooth and are in contact so that there are no high spots to wear down and permit motion along the axis of rotation. Member 12 is formed with a pair of holes 31 through the portions on either side of slot 22. Member 13 is formed with a hole 32 which is larger than hole 31. The axis of holes 31 and 32 must, of course, be normal to the plane of rotation of member 13 within slot 22. After member 13 is inserted into slot 22 in member 12, member 13 is slid out as far as shoulder 25 will allow (as shown in FIG. 2), thereby exposing hole 32 to allow bearing sleeve 15 to be forcibly fitted therein. Holes 31 and 32 are then aligned and pin 14 is forcibly inserted through both holes to pivotally connect members 12 and 13, thus making sleeve 15 fully captive as shown in FIG. 3. Pin 14 is shown with one end 33 tapered to facilitate insertion into hole 31 and through bearing sleeve 15, but such tapering is optional.

Figure 4:
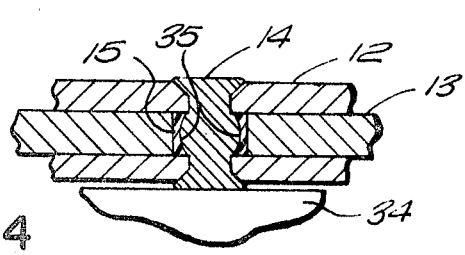
FIG. 4 is a sectional view as shown in FIG. 3 but after the compression step.
Figure 5:
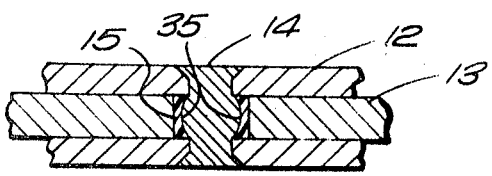
FIG. 5 is a sectional view of the completed hinge of FIG. 3.

Compressive force is then applied longitudinally to both protruding ends of pin 14, as by hammering the pin which has been placed upon anvil 34. Since compressive forces are evenly distributed throughout pin 14, it will expand where it is allowed to do so. It can expand slightly in hole 31 in external member 12, and this is sufficient to permanently fix pin 14 immovably therein. However, less resistance to expansion of pin 14 is presented by sleeve 15, consequently a slight bulge 35 appears in pin 14, compressing and distorting sleeve 15 as shown exaggerated in FIGS. 4 and 5. Since surfaces 26 and 27 are in smooth contact and sleeve 15 is snugly fitted into hole 32, there is no place for sleeve 15 to expand so it is necessarily in compression over its entire surface area and its inner surface is deformed.

In the resultant assembly, there is extremely high pressure exerted by pin 14 on bearing sleeve 15. This pressure between pin 14 and sleeve 15 maintains members 12 and 13 in the same relative position no matter how they are held, yet the self-lubricating properties of the bearing sleeve material allow the members to be rotated relative to one another with the application of a relatively small amount of force. Since there is no metal-to-metal contact between pin 14 and rotating member 13, there is no galling to cause binding or freezing, and because the bearing is practically indestructible with normal wear there is no loosening after prolonged use which would permit coasting. The result is a long lasting hinge with the desired characteristics of durability, reliability and smooth effortless operation without backlash. Since sleeve 15 is very highly compressed by the expansion of pin 14, substantially no lateral motion exists between members 12 and 13 when the instrument is clamped together and the grip of jaws 21 remains as set.

It is emphasized that although the invention is described primarily in terms of surgical instruments, this invention is not so restricted and may be used wherever a box lock type hinge is applicable. Various changes and modifications may occur to those skilled in this art. Accordingly, the present invention is to be construed as limited only by the spirit and scope of the appended claims.

What is claimed is:

1. An improved forceps type surgical instrument, comprising:
   a first member formed with an open slot having confronting faces;
   a second member having a constricted area of substanitally the same cross-section as said slot, said second member being pivotally connected to said first member within said slot and having a plane of rotation through the open ends of said slot, said second member having a bore through said constricted area, the axis of said bore being normal to said plane of rotation;
   a substantially cylindrical pivot pin fixed to said first member and passing through said bore, the axis of said pin being normal to said plane of rotation; and
   an annular self-lubricating plastic bearing sleeve concentrically surrounding said pin, said sleeve being captively retained and compressed over its entire volume within said bore by the outer surface of said pivot pin, the wall of said bore and the inner surfaces of said slot in said second member.

2. An improved forceps type surgical instrument as in claim 1, wherein:
   said slot is generally rectangular in crosssection; and
   said constricted area is of substantially the same cross-section as said slot, thereby defining shoulders on said second member at each end of said constricted area, each shoulder having a face generally normal to the surface of said constricted area, thereby preventing removal of said second member from said slot in said first member.

3. An improved forceps type surgical instrument, as in claim 1, wherein:
   said pivot pin is sufficiently deformed within said bore so as to maintain said sleeve in a highly compressed state within said second member.

4. An improved forceps type surgical instrument as in claim 3, wherein:
   said bore in said second member is larger than said pivot pin; and
   said bearing sleeve substantially fills the annular space between said pivot pin and the wall of said bore.

5. An improved foreceps type surgical instrument as in claim 1, wherein:
   said bearing sleeve is chemically and physically stable at sterilization temperatures.

6. An improved forceps type surgical instrument as in claim 5, wherein:
   said bearing sleeve is made of Teflon.

7. A method of making an improved forceps type surgical instrument, comprising the steps of:
   inserting a second member having a flattened area with a bore therethrough into a slot in a first member, said first member having a bore therethrough transverse of said slot;
   inserting an annular self-lubricating plastic bearing sleeve into said bore in said second member;
   axially aligning said bore in said second member with said bore in said first member;
   inserting a pivot pin through said bores;

compressing said pivot pin within said bores;
smoothly finishing the external surfaces where the ends of said pivot pin protrude.

8. A method as recited in claim 7, wherein:
said pivot pin is compressed by means of hammering longitudinally against an anvil.

9. A method as recited in claim 7, wherein:
said compressing step causes said pivot pin to deform in such manner as to highly compress said bearing sleeve.

10. A method as recited in claim 9, wherein:
said inserting, said aligning and said compressing steps cause said bearing sleeve to be captively retained and to be highly compressed over its entire surface area.

11. A method as recited in claim 7, wherein:
said compressing step causes said pivot pin to expand within said bore in said first member thereby pressing against the walls of said bore so that said pivot pin becomes fixed to said first member.

References Cited

UNITED STATES PATENTS

| 1,676,042 | 7/1928 | Ogden | 32—62 XR |
| 2,626,460 | 1/1953 | Wahl | 30—266 |
| 2,939,215 | 6/1960 | Putsch | 30—266 |

L. W. TRAPP, Primary Examiner

U.S. Cl. X.R.

30—267; 76—101, 104